United States Patent [19]

Voegelin

[11] 4,128,154

[45] Dec. 5, 1978

[54] POSITIVE ENGAGEMENT CLUTCH WITH SOFT ENGAGEMENT MOTION

[75] Inventor: Heinrich Voegelin, Wiler b. Utzenstorf, Switzerland

[73] Assignee: Fritz Buser AG Maschinenfabrik, Wiler b. Utzenstorf, Switzerland

[21] Appl. No.: 776,736

[22] Filed: Mar. 11, 1977

[30] Foreign Application Priority Data

Mar. 12, 1976 [CH] Switzerland ............. 3116/76

[51] Int. Cl.² .............................................. B41F 13/24
[52] U.S. Cl. ................................ 192/67 P; 101/235; 192/16
[58] Field of Search ............. 192/67 P, 67 R, 16, 192/18 A, 139; 101/235, 116, 216; 83/203, 205, 283

[56] References Cited

U.S. PATENT DOCUMENTS

| | | | |
|---|---|---|---|
| 3,537,393 | 11/1970 | Hegi ................................... | 192/16 X |
| 3,578,118 | 5/1971 | Wetzel ............................ | 192/67 R X |
| 3,606,800 | 9/1971 | Treff et al. .................... | 101/216 UX |
| 3,618,722 | 11/1971 | Eschenbach et al. ......... | 192/67 P X |

*Primary Examiner*—James F. Coan
*Attorney, Agent, or Firm*—Flynn & Frishauf

[57] ABSTRACT

To place a driven shaft in accurate angular alignment with respect to a continuously rotating driving shaft or, selectively, with respect to a fixed reference, the fixed reference is formed as a housing, the driving shaft has a disk with a cam track attached thereto, and the housing likewise has a disk with a cam track. The driven shaft has an engagement pin connected thereto, axially slidable and engageable, respectively, with the cam tracks of the driving shaft, or of the housing,. The cam tracks are arranged to carry along and gradually accelerate the pin coupled to the driven shaft until the pin locks at a predetermined position in the cam track to define the relative angular position of driving shaft and driven shaft; upon different axial movement, the engagement pin is permitted to slide out of engagement with the cam track disk coupled to the driving shaft and engage a similar, and stationary cam track on the housing, again formed with a stop or rest position which again determines the angular relationship of the driven shaft with respect to the housing, and hence with respect to the reference. Axial sliding movement of the engagement pin is controlled by pneumatic pressure acting on spring-loaded pistons. The clutch is particularly useful in connection with printing machinery, especially rotary screen printing machinery, to provide for accurate alignment of intermittently operating printing stencil cylinders with respect to the instantaneous angular position of the machine drive shaft.

18 Claims, 3 Drawing Figures

POSITIVE ENGAGEMENT CLUTCH WITH SOFT ENGAGEMENT MOTION

Cross reference to rotary screen printing machine components: U.S. Pat. Nos. 3,960,076, WICK; and 3,971,313, by the inventor hereof, both assigned to the assignee of the present application.

The present invention relates to a positive engagement clutch by which a first or driving shaft which is continuously rotating and can be coupled to a second or driven shaft when a command signal is applied, and in which the relative angular positions of the shafts, when engaged, can be accurately predetermined, and in which, preferably, the angular position of the driven shaft, when disengaged from the clutch with respect to an outer housing or frame, can be accurately predetermined.

Various types of drives require engagement of a driving shaft with a driven shaft with accurate predetermined relative angular position in order to provide for registration of a driven element with respect to the driving shaft. Continuously operating printing machines, for example rotary screen printing machines, are one application, particularly in printing machines in which only a portion of the circumference of the cylindrical screen printing roller is used. Other uses for such a clutch are conveyor or transport systems combined with or coupled to packaging machinery, in which the working cycle of the packaging machinery and a continuously operating conveyor must be accurately synchronized. In all such clutches, the drive shaft usually is coupled to a machine which operates through a certain cycle, and has a continuously driven output shaft. The driven shaft can be locked in a predetermined angular position with respect to a reference — typically a housing — and can be coupled to the driving shaft with predetermined relative angular position. Stopping the driven shaft after having been coupled to the driving shaft, and coupling the driven shaft to the driving shaft subjects the apparatus to high deceleration and acceleration forces. These forces place high stresses on the coupling elements, since engagement and disengagement of the clutch theoretically results in acceleration and deceleration rates to couple or uncouple the driven element in theoretically infinitely short time to the driven shaft, for acceleration to or deceleration from the rotary speed of the driven shaft. To prevent damage to the coupling elements, since the forces, theoretically, would be infinite, in the past permitted engagement and disengagement of the clutch only at very low operating speeds, practically at stopped conditions. If it is necessary to engage and disengage the clutch during operation, it was customary to interpose a friction or similar slip clutch parallel with the positive engagement clutch to provide for gradual acceleration and deceleration. This expedient does not, however, always ensure accurate relative angular positioning between the drive shaft and the driven shaft, and hence angular registration of the machine elements coupled to the drive shaft, and to the driven shaft, respectively.

Positive engagement clutches in which the drive shaft and the driven shaft are always engaged with a respective relative angular position in the past have been constructed by using engagement elements including an engagement cam or projection-and-recess arrangement interposed between the drive shaft and the driven shaft so that, when in engagement, the drive shaft and the driven shaft will always have the same respective relative angular position. The engagement forces in such arrangements are high and result in jarring and shocks to the driven shaft as well as to the drive shaft due to the theoretically infinite acceleration and deceleration of the driven shaft, and the elements coupled thereto, upon engagement of the clutch.

It is an object of the present invention to provide a positive engagement clutch in which the relative angular alignment of the driven shaft and of the driven shaft is accurately predetermined, in which, preferably, also the position of the driven shaft, when disengaged, is accurately predetermined with respect to a fixed reference, for example a housing, and in which engagement and disengagement of the driven element is gradual and permits engaging and disengaging the clutch without jolts, jarring, or applying excessive forces on the clutch elements.

SUBJECT MATTER OF THE PRESENT INVENTION

Briefly, the coupling element is secured to the driven shaft which includes a movable engagement rod, located parallel to the driven and driving shafts and axially slidable with respect to the end pieces of said shafts. The driving shaft has a disk attached thereto in which a groove is cut, engageable by the engagement rod. The groove is shaped to provide for acceleration of the engagement rod, in circumferential direction, when the engagement rod is engaged with the groove. The groove terminates at a holding position at a predetermined angular location with respect to the driving shaft. To decelerate, the groove can be continued beyond the holding position to permit the engagement rod to slide out of the holding position and decelerate the driven shaft, which is coupled to the engagement rod, smoothly and gradually.

A similar plate can be located on the housing, and the rod constructed to engage a curve in the housing which effects smooth deceleration and, again, locking at a holding position with respect to the housing. Thus, the driven shaft, to which the engagement rod is secured, can be smoothly accelerated upon engagement of the rod with the acceleration curve, accurately located with respect to the driving shaft when engaged in the holding position, and again smoothly decelerated and accurately located with respect to the housing by engagement of the engagement rod with the holding curve secured to the housing, and likewise formed with a rest position.

Drawings, illustrating an example:

Figure 1:
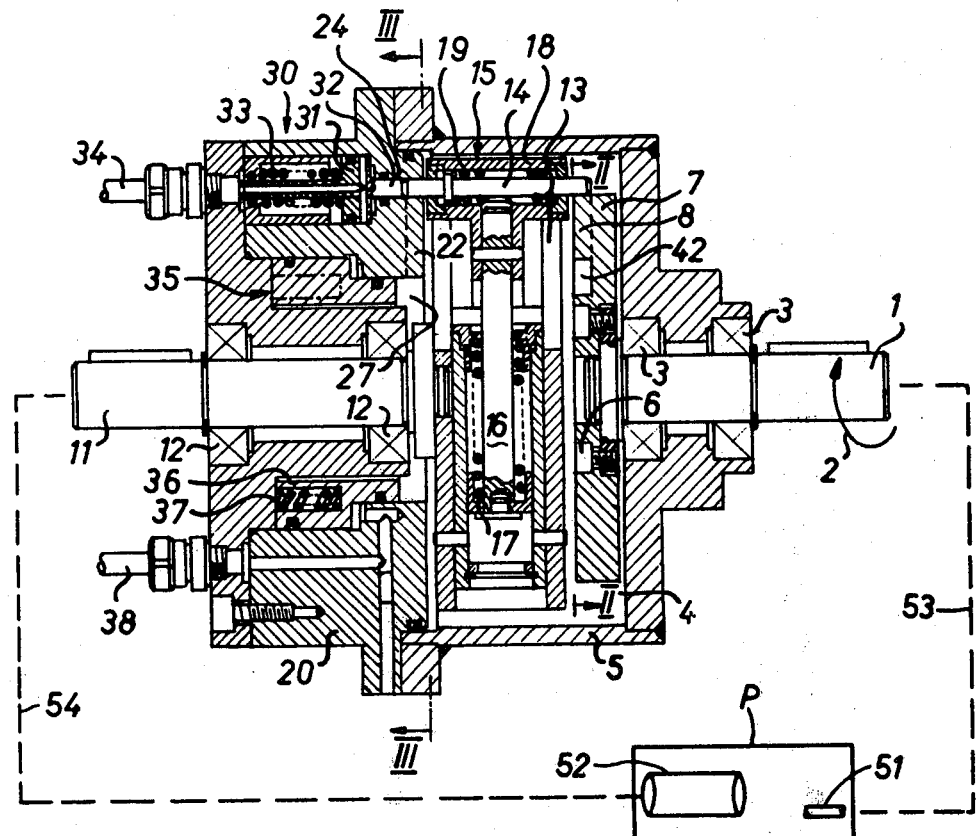
FIG. 1 is an axial cross-sectional view, omitting non-essential elements, of the clutch.

The clutch is arranged to connect the driving shaft 1 to the driven shaft 11. The direction of rotation of the driving shaft is indicated by arrow 2 and, with respect to the end of the driving shaft 1, is rotating in clockwise direction. The clutch can be used with either direction of rotation. The operation of the clutch will be described in connection with the direction of rotation as shown. Shaft 1 is journalled in ball bearings, or similar bearings 3, located in a housing 5. The shaft extends into a clutch chamber 4. A disk 7 is secured to the shaft 1 by screws 6. The disk 7 is formed at its surface with a groove 8, best seen in FIG. 2, which is generally heart-shaped.

The driven shaft 11 is located coaxially with respect to driving shaft 1 and journalled by bearings 12 in the housing 5. Shaft 11 carries a transverse coupling unit 13 at its inner end, rotating with shaft 11 when the clutch is engaged, and stopping shaft 11 when the clutch is disengaged. The coupling unit 13, thus, is rigidly secured to shaft 11 by suitable attachment means, not shown. The coupling unit 13 includes a transversely extending, generally T-shaped element 15 in which coupling rod or pin 14 is located. Rod or pin 14 is axially movable, that is, slidable from right to left (FIG. 1) and additionally is movable radially, that is, in or out with respect to the center line of shafts 1, 11. To permit movement of the coupling pin 14 in radial direction, the cross element of the T-shaped coupling element 15 is secured to a holding bar 16, permitting radial sliding movement, the cross element and hence the pin 14 being biassed outwardly by a spring 17 located within the coupling unit 13. The cross element 18 of the T-shaped element 15, which is the portion actually carrying the coupling pin 14, is hollow and includes a spring 19 which bears against a flange or shoulder formed on pin 14 to bias pin 14 towards the left in FIG. 1. The pin 14, thus, is subject to two spring forces: The force of spring 17 which tends to move the pin radially outwardly, and the force of spring 19 which tends to move the pin to the left. As shown in the drawings, the left side portion of the housing 5 of the coupling carries the command or operating means to control engagement and disengagement of the clutch. The command and operating are included in a control block 20, fixedly secured to the housing 5; they may form an integral part thereof. The control block 20 has an inner surface facing the clutch chamber 4. The inner surface of control block 20 has a groove 22 cut therein.

Figure 3:
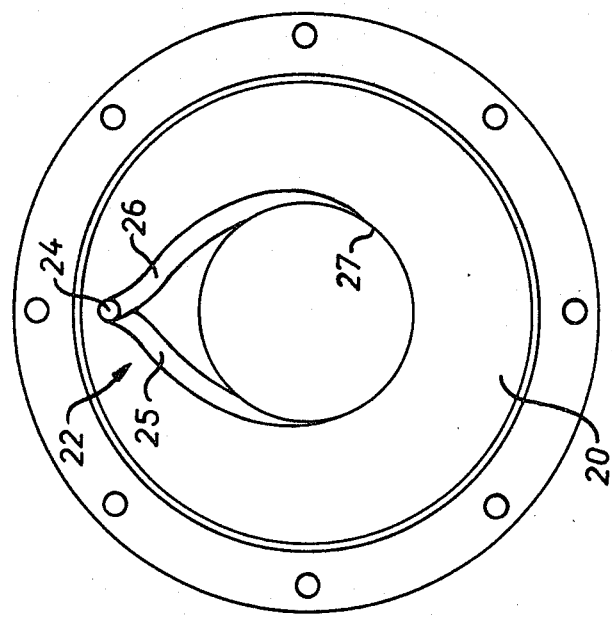
FIG. 3 is a cross-sectional view along lines III—III of FIG. 1.
Figure 2:
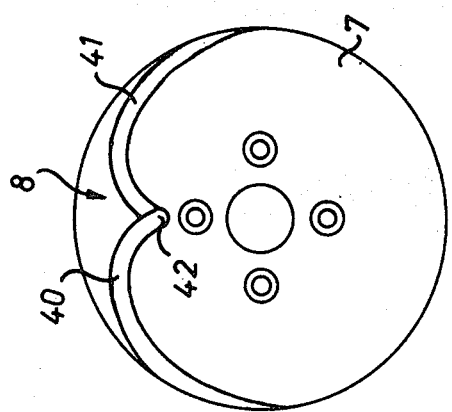
FIG. 2 is a cross-sectional view along lines II—Ii of FIG. 1.

Groove 8 of the disk 7, secured to the driving shaft 1, has three portions: A leading groove portion 40, a central or rest or engagement stop position 42, and a trailing portion 41. The groove 22 in control block 20 has leading and trailing portions 25, 26 extending from a central bore 27 and terminating at a rest or stop position 24. The shapes of the grooves are best seen in FIGS. 2 and 3.

The control block 20 includes a fluid pressure-operated operating unit 30. Preferably, unit 30 is operated by pneumatic pressure and has a cylinder-piston arrangement. The piston 31 is biassed towards the right-hand end position (FIG. 1) by a spring 33, but can be moved towards the left upon introduction of pneumatic pressure through pressure line 34, and transverse ducts passing through the piston. Upon introduction of compressed air through line 34, piston 31 will be pressed towards the left, with respect to FIG. 1. In the position shown in FIG. 1, piston 31 is not subjected to fluid pressure, and is in its rest or vented position. Pressurizing line 34 results in engagement of the clutch.

A second operating unit 35 is secured to the housing 5 of the clutch. It is positioned within the central bore 27 of unit 30. Operating unit 35 includes a ring-shaped piston 36 which is biassed to extend towards the right (with respect to FIG. 1) by one or more springs 37. A fluid pressure, preferably compressed air line 38 is connected to the right side of the piston 36 to move the piston counter the force of spring 37. In the position shown in FIG. 1, line 38 was connected to the piston so that the second operating unit 35 is in its pressurized condition. The compressed air is conducted to the piston by ducts shown in the figure, which can be vented through a suitable check valve (not shown).

In a preferred form, the space 4 within the housing is filled with oil so that the clutch can engage and disengage while being under constant lubrication, and engagement and disengagement movement is carried out without, essentially, putting wear and tear or friction forces on the relatively movable elements, and to permit smooth and noiseless operation of engagement and disengagement of the clutch.

Operation, with reference to FIGS. 2 and 3: Let it be assumed that driving shaft 1 is rotating freely, and that the driven shaft 11 is locked in a predetermined reference position. The reference point is taken as the clamped or locked position of the housing 5 with respect to a frame of a machine, or the like. Thus, the position of the housing determines the angular stop or reference position of shaft 11.

The position of shaft 11 and rotation is determined by the position and rotation of the T-shaped coupling unit 13 secured thereto. To lock shaft 11 with respect to housing 5, pneumatic pressure is applied to line 34 to pressurize operating unit 30. Piston 31 will be moved towards the left with respect to FIG. 1, counter the force of spring 33. This permits coupling pin or rod 14 to move towards the left under the force of spring 19, so that the pin 14 will engage the rest or stop position 24 formed as a bore in the face of the control block 20. This places the angular position of the driven shaft 11 in a predetermined location with respect to housing 5. Disk 7, coupled to the driving shaft 1, can rotate freely.

Engagement of the clutch from stopped position: The driving shaft 1 continues to rotate; line 34 is vented. Venting of line 34 permits extension of the piston 31 towards the right under the force of spring 33. Piston 31, coupled to a push pin 32, pushes coupling pin or rod 14 out of the rest or stop position hole 24 to move the pin 14 into the position shown in FIG. 1. Rest or stop position 24 is formed as a bore slightly deeper than the remainder of the groove 22. Movement of the pin 32, due to spring pressure 33, moves the engagement or coupling pin 14 out of the bore of the rest position 24 and into the range of the groove portion 26. Simultaneously, spring 17, acting radially, tends to move pin 14 radially outwardly. The pin 14, now in the position of FIG. 1, will catch the outward radial end of groove 40 in the disk 7 as disk 7 rotates with the driving shaft 1. The pin or rod 14 will then move simultaneously from the position 24 (FIG. 3) through groove 26 (FIG. 3) and through groove 40 (FIG. 2). This accelerates the shaft 11 to the speed of shaft 1. The two groove portions 26, 40 thus can be termed the "engagement curves" for the pin 14. When the second or driven shaft 11 has reached the same speed as the driving shaft 1, pin 14 will have reached the rest or stop position 42 in disk 7 and will also have reached the central bore 27 of the control block 20. The spring 17 continues to press pin 14 radially against the inner wall of bore 27. The pin 14 can thus slide smoothly around the inner wall of bore 27, while engaged with the rest or stop position 42 of the driven shaft 1. Thus, the cross unit 13, coupled to the driven shaft 11, is carried along by the driving shaft 1, at a predetermined angular position as determined by the position of the rest or stop position 42. The rest or stop position, preferably, is formed as a bore, slightly deeper than the groove portions 40, 41.

Disengagement of clutch, and locking of driven shaft 11: Pin 14 will remain engaged in the rest or stop position 42 of disk 7 coupled to the driving shaft 1 until a disengagement or de-clutching command is received. This disengagement or de-clutching command is governed by venting pressure line 38, permitting the ring piston 36 to move to the right—with respect to FIG. 1—under the force of spring 37. This pushes the piston 36 against the depth of the groove 25 of the cam groove 22 in the control block 20. The pin 14, upon entering the groove 25, can then enter the groove portion 41 of disk 7 and leave the rest or stop position 42. This results in deceleration of the second or driven shaft 11 until it reaches speed zero, which occurs when the pin 14 engages the bore 24 in which pin 32, secured to piston 31, is located. Simultaneously, the pin 14 is freed from engagement with the groove portion 41 in disk 7. The groove portions 25, 41, therefore, may be termed the "disengagement curves" or "disconnect cam tracks". To permit engagement of pin 14 in the bore 24, line 34 should be pressurized when line 38 is vented, to pull pin 32 towards the left (FIG. 1).

The acceleration of the driven shaft 11 leads from stop position to an engagement position which is accurately predetermined with respect to the driving shaft 1, due to the fixed location of the cross element 13 with respect to the driven shaft 11, and the fixed location of the rest or stop position 42 on disk 7 with respect to the driving shaft 1. Deceleration of shaft 11 and stopping of shaft 11 will, conversely, result in locking shaft 11 at a predetermined angular position with respect to housing 5 due to engagement of the same pin 14 with the rest or stop position formed by bore 24.

The embodiment, as shown in FIG. 1, provides for engagement of the shafts 1, 11 in one-half revolution; and for locking of the second shaft 11 also in one-half revolution. Other curves and cam tracks can be provided. The shape of the guide curve or groove 8 and the guide curve or groove 22 can be differently selected. The particular shapes shown are preferred, however, since they result in minimum changes in acceleration and deceleration rates and minimum acceleration and deceleration forces. The level of the bottom of the respective grooves or groove portions can be different and suitably selected to reliably ensure against inadvertent engagement or disengagement of pin 14. A spring-loaded ball can also be used to further ensure positive seating at the respective stop or rest positions. Pin 14, or at least the portions of pin 14 engaging in the respective grooves 8, 22, preferably is rotatable in order to prevent reaction of sliding forces on the clutch and to permit free movement of the pin in the respective grooves. Small rotatable sleeves surrounding the groove 14 at the respective end positions, in the form of cam followers can provide for free rotation. These details are not shown in the drawings.

The clutch can be used to drive any desired type of machine, and result in an output shaft rotation which is accurately predetermined with respect to an instantaneous angular position of the driving shaft 1, permitting locking of the driven shaft 11 in the respective angular position and, additionally, locking of the driven shaft 11 in a predetermined angular position with respect to the housing of the clutch, when disengaged. Both engagement as well as disengagement are carried out with sufficient delay in order to prevent shock loading, jarring of components, and excessive forces.

The clutch is particularly suitable to connect the rotary screen in a rotary screen printing machine to the drive shaft of the machine. A rotary screen printing machine P (FIG. 1) has a main machine drive shaft 51 which is connected, as shown schematically by the broken lines 53, to the driving shaft 1 of the clutch. The driven shaft 11 is connected, as schematically shown by broken lines 54, to the rotary screen of the machine. Typical rotary screens, and arrangements to drive the screens are shown, for example, in U.S. Pat. Nos. 3,960,076, WICK; and 3,971,313, by the inventor hereof, both being assigned to the assignee of the present application. While applicable to various types of apparatus, it is particularly suitable for printing machinery and especially for rotary printing machinery, where registration of the position of one rotary element with respect to another is important, although the two rotary elements do not continuously rotate in synchronism with each other.

Various changes and modifications may be made within the scope of the inventive concept; e.g. the clutch can be actuated mechanically, hydraulically or electrically.

I claim:

1. Positive engagement clutch having
   a housing (5) forming a position reference;
   a driving shaft (1) journalled in the housing;
   a driven shaft (11) journalled in the housing;
   a coupling unit (13) secured to and rotating with the driven shaft (11) and having engagement means (14) engageable with the driving shaft (1) to selectively couple the driving shaft and the driven shafts together, or to separate said shafts and to couple the driven shaft (11) to the housing (5) to lock the driven shaft with respect to the reference position of the housing,
   wherein the engagement means (14) comprises
     a slidable engagement pin or rod (14);
     a rotating cam track element (7, 8) secured to the driving shaft (1) and carrying a rotating guide cam track (8);
     a fixed cam track element (20) secured to the housing (5) and carrying a fixed cam track (22) positioned in facing relation to the rotating cam track (8), the engagement pin (14) being selectively engageable with either, or both said cam tracks;
     and operating means (30, 35) engageable with the engagement pin or rod (14) to move the pin, selectively, into engagement with the fixed and the moving cam track elements.

2. Clutch according to claim 1, wherein said cam track elements comprise disks positioned in facing, axially aligned relationship;
   said engagement pin (14) being axially slidable in a direction parallel to the axes of said shafts (1, 11);
   and wherein said cam tracks (8, 22) are formed in the end faces of said disks (7, 20) and each include a fixed or rest position (42, 24) at which engagement of said pin with said fixed or rest position couples the pin (14) to the respective disk (7, 20) only, and thereby locks the driven shaft (11) selectively, either to the driven shaft (1) with the angular alignment as determined by the position of said pin (14) with respect to the driven shaft (11), and said rest position (42) with respect to the driving shaft, or as determined by the angular position of the rest position (24) of the fixed cam (22) on the housing (5).

3. Clutch according to claim 1, wherein the cam track elements (7, 20) comprise axially aligned facing disks (7, 20), and the cam tracks are formed as grooves in said disks, the cam tracks having, each, an engagement portion (26, 40) and a disengagement portion (25, 41), and a stop or rest position (24, 42) between said engagement portions, the engagement pin or rod being engageable in said groove portions and movable therein when controlled by the operating means (30, 35) to engage the respective groove portions, and coming to a stop or rest at the respective rest position.

4. Clutch according to claim 3, wherein the depth of the grooves of the engagement portions (26, 40) and of the disengagement portions (25, 41) is different.

5. Clutch according to claim 3, wherein the depth of the rest position is different from the depth of the grooves forming the engagement and the disengagement portions.

6. Clutch according to claim 1, wherein the coupling unit comprises a carrier element (15) extending transversely of the driven shaft (11);
the engagement pin or rod (14) being located eccentrically with respect to the driven shaft (11) and extending axially parallel with respect thereto, and being axially slidable;
and spring means (19) resiliently axially positioning said pin or rod (14) but permitting movement thereof in axial direction to engage a respective cam track when acted on by said operating means.

7. Clutch according to claim 6, wherein said carrier element (15) comprises means (16, 17) radially movably securing said engagement pin or rod in a position radially variable with respect to the center of rotation of the driven shaft (11);
and radial spring means (17) resiliently biassing the position of said engagement pin or rod (14) at a predetermined radial distance with respect to the center of rotation of the driven shaft (11).

8. Clutch according to claim 1, wherein the operating means (30, 35) comprises cylinder-piston means (30, 35) secured to the housing (5), and force transfer means (31; 32) acted on by the piston of said cylinder-piston arrangement and located within the housing for engagement with said pin or rod (14) to move said pin or rod, selectively, in engagement with said cam tracks.

9. Clutch according to claim 8, wherein said engagement pin or rod (14) is axially slidable;
and further comprising spring means (19) positioning said pin or rod (14) in a predetermined axial position, the spring means acting counter the force exerted by said force transfer means controlled by said piston-cylinder arrangement to control position of the pin or rod (14) upon pressurization of the piston-cylinder arrangement, or venting thereof, and positive return of said pin or rod under the force of said spring means (19).

10. A rotary screen printing machine having a frame, a continuously rotating main shaft (51) and an intermittently rotating printing screen (52);
a positive engagement clutch connecting said continuously rotating shaft (51) and the shaft of said rotary screen, to preserve alignment of the relative angular position of the main shaft (51) and said screen (52) upon rotation, the screen being locked with respect to the frame upon disengagement of the clutch and to preserve alignment of said screen (52) with respect to the frame, when stationary;
wherein said clutch comprises a housing (5) secured to said frame and forming a position reference;
a driving shaft (1) journalled in the housing;
a driven shaft (11) journalled in the housing;
a coupling unit (13) secured to and rotating with the driven shaft (11) and having engagement means (14) engageable with the driving shaft (1) to selectively couple the driving shaft and the driven shafts together, or to separate said shafts and to couple the driven shaft (11) to the housing (5) to lock the driven shaft with respect to the reference position of the housing,
wherein the engagement means (14) comprises
a slidable engagement pin or rod (14);
a rotating cam track element (7, 8) secured to the driving shaft (1) and carrying a rotating guide cam track (8);
a fixed cam track element (20) secured to the housing (5) and carrying a fixed cam track (22) positioned in facing relation to the rotating cam track (8), the engagement pin (14) being selectively engageable with either, or both said cam tracks;
and operating means (30, 35) engageable with the engagement pin or rod (14) to move the pin, selectively, into engagement with the fixed and the moving cam track elements.

11. Machine according to claim 10, wherein the operating means (30, 35) comprises cylinder-piston means (30, 35) secured to the housing (5), and force transfer means (31; 32) acted on by the piston of said cylinder-piston arrangement and located within the housing for engagement with said pin or rod (14) to move said pin or rod, selectively, in engagement with said cam tracks.

12. Machine according to claim 10, wherein said cam track elements comprise disks positioned in facing, axially aligned relationship;
said engagement pin (14) being axially slidable in a direction parallel to the axes of said shafts (1, 11);
and wherein said cam tracks (8, 22) are formed in the end faces of said disks (7, 20) and each include a fixed or rest position (42, 24) at which engagement of said pin with said fixed or rest position couples the pin (14) to the respective disk (7, 20) only, and thereby locks the driven shaft (11) selectively, either to the driven shaft (1) with the angular alignment as determined by the position of said pin (14) with respect to the driven shaft (11), and said rest position (42) with respect to the driving shaft, or as determined by the angular position of the rest position (24) of the fixed cam (22) on the housing (5).

13. Machine according to claim 10, wherein the cam track elements (7, 20) comprise axially aligned facing disks (7, 20), and the cam tracks are formed as grooves in said disks, the cam tracks having, each, an engagement portion (26, 40) and a disengagement portion (25, 41), and a stop or rest position (24, 42) between said engagement portions, the engagement pin or rod being engageable in said groove portions and movable therein when controlled by the operating means (30, 35) to engage the respective groove portions, and coming to a stop or rest at the respective rest position.

14. Machine according to claim 13, wherein the depth of the grooves of the engagement portions (26, 40) and of the disengagement portions (25, 41) is different.

15. Machine according to claim 13, wherein the depth of the rest position is different from the depth of the grooves forming the engagement and the disengagement portions.

16. Machine according to claim 10, wherein the coupling unit comprises a carrier element (15) extending transversely of the driven shaft (11);

the engagement pin or rod (14) being located eccentrically with respect to the driven shaft (11) and extending axially parallel with respect thereto, and being axially slidable;

and spring means (19) resiliently axially positioning said pin or rod (14) but permitting movement thereof in axial direction to engage a respective cam track when acted on by said operating means.

17. Machine according to claim 10, wherein said carrier element (15) comprises means (16, 17) radially movably securing said engagement pin or rod in a position radially variable with respect to the center of rotation of the driven shaft (11);

and radial spring means (17) resiliently biassing the position of said engagement pin or rod (14) at a predetermined radial distance with respect to the center of rotation of the driven shaft (11).

18. Machine according to claim 11, wherein said engagement pin or rod (14) is axially slidable;

and further comprising spring means (19) positioning said pin or rod (14) in a predetermined axial position, the spring means acting counter the force exerted by said force transfer means controlled by said piston-cylinder arrangement to control position of the pin or rod (14) upon pressurization of the piston-cylinder arrangement, or venting thereof, and positive return of said pin or rod under the force of said spring means (19).

* * * * *